United States Patent
Foster (10) Patent No.: US 6,782,994 B1
(45) Date of Patent: Aug. 31, 2004

(54) HEAVY-DUTY RECIPROCATING SLAT CONVEYOR

(75) Inventor: Raymond Keith Foster, Madras, OR (US)

(73) Assignee: Keith Investments L.L.C., Madras, OR (US)

( * ) Notice: Subject to any disclaimer, the term of this patent is extended or adjusted under 35 U.S.C. 154(b) by 0 days.

(21) Appl. No.: 10/449,933

(22) Filed: May 30, 2003

(51) Int. Cl.$^7$ ............................................. B65G 25/04
(52) U.S. Cl. ............................. 198/750.2; 198/750.4; 198/750.5
(58) Field of Search ...................... 198/750.1, 750.2, 198/750.4, 750.5

(56) References Cited

U.S. PATENT DOCUMENTS

| | | | | |
|---|---|---|---|---|
| 4,727,978 A | * | 3/1988 | Hallstrom, Jr. ............. | 198/737 |
| 4,856,645 A | * | 8/1989 | Hallstrom, Jr. ........... | 198/750.4 |
| 5,222,593 A | * | 6/1993 | Quaeck .................... | 198/750.5 |
| 5,228,556 A | * | 7/1993 | Quaeck .................... | 198/750.3 |
| 5,310,044 A | * | 5/1994 | Quaeck .................... | 198/750.5 |
| 5,323,894 A | * | 6/1994 | Quaeck .................... | 198/750.3 |
| 5,346,056 A | * | 9/1994 | Quaeck .................... | 198/750.3 |
| 5,402,878 A | * | 4/1995 | Lutz ........................ | 198/750.6 |
| 5,489,018 A | * | 2/1996 | Foster ..................... | 198/750.5 |
| 5,540,322 A | * | 7/1996 | Foster ..................... | 198/750.3 |
| 5,547,067 A | * | 8/1996 | Foster ..................... | 198/750.3 |
| 5,588,522 A | * | 12/1996 | Foster et al. ............. | 198/775 |
| 6,513,648 B1 | * | 2/2003 | Hallstrom et al. ....... | 198/750.4 |
| 6,651,806 B2 | * | 11/2003 | Hallstrom ................ | 198/750.3 |

* cited by examiner

Primary Examiner—Douglas Hess
(74) Attorney, Agent, or Firm—Delbert J. Barnard (57) ABSTRACT

A plurality of laterally spaced apart, longitudinally extending, V-shaped upper conveyor slats (10) are provided. Each upper conveyor slat (10) has a crown and opposite side portions that slope laterally outwardly and downwardly from the crown. The side portions have lower surfaces. A plurality of laterally spaced apart, longitudinally extending, V-shaped lower conveyor slats (12) are provided. These lower conveyor slats (12) are positioned between the upper conveyor slats (10). Each lower conveyor slats includes a valley and side portions that slope laterally outwardly and upwardly from the valley. The side portions have upper and lower surfaces. The side portions of the upper conveyor slats (10) overhang the side portions of the lower conveyor slats (12). A plurality of slide bearings (14) are positioned vertically between the upper and lower conveyor slats (10, 12) where the side portions of the upper conveyor slats (10) overhang side portions of the lower conveyor slats (12). The slide bearings (14) have upper surfaces on which the lower surfaces of the side portions of the upper conveyor slats (10) slide. The slide bearings (14) also have spaces in which outer edge portions of the side portions of the lower conveyor slats (12) are received and slide. In use, the upper and lower conveyor slats (10, 12) reciprocate in a longitudinal direction and are supported for such movement by the slide bearings (14).

22 Claims, 7 Drawing Sheets

FIG.9

HEAVY-DUTY RECIPROCATING SLAT CONVEYOR

TECHNICAL FIELD

This invention relates to reciprocating slat conveyors and, more particularly, to reciprocating slat conveyors that are adapted to withstand heavy objects being dropped on them and also adapted for conveying heavy loads and difficult-to-convey materials, such as hot asphalt, for example.

BACKGROUND OF THE INVENTION

U.S. Pat. No. 5,044,870, granted Sep. 3, 1991 to Raymond K. Foster, and entitled Method For Collecting And Compacting Garbage And Then Loading It Into A Road Vehicle, discloses a conveyor that is adapted for inclusion in a vault into which garbage is deposited for moving out of the vault into a transporting vehicle. The conveyor disclosed by this patent has relatively heavy-duty moveable slats that are mounted above relative to thick fixed slats that are both between and below the moveable slat. The moveable slats are V-shaped and each have a crown and opposite side portions that slope laterally outwardly and downwardly from the crown. The fixed slats are also V-shaped and each include a valley and side portions that slope laterally outwardly and upwardly from the valley. The gap between adjacent moveable slats is relatively narrow. The fixed slats carry fixed bearings on which the moveable slats slide. The moveable slats are driven by linear hydraulic motors which are positioned below the fixed slats and include connections that extend upwardly to the moveable slats.

U.S. Pat. No. 5,310,044, granted May 10, 1994 to Manfred W. Quaeck, and entitled Reciprocating Floor Conveyor Having Slats Of Varied Size And Drive System, therefore, discloses a conveyor having moveable lower slats positioned between moveable upper slats. The upper and lower slats are both substantially U-shaped in cross-section. The upper slats are supported by longitudinally extending bearings which are positioned within the slats. The lower conveyor slats are supported by bearings that are on top of transverse frame members. The embodiment disclosed in this patent is only capable of handling light loads.

There is a need for a heavy-duty slat conveyor that is supported by heavy-duty bearings that contact side edge portions of upper and lower conveyor slats. There is also a need for an improved way of connecting the upper and lower conveyor slats to linear hydraulic drive units which are provided to drive the conveyor slats back and forth along the slide bearings. It is an object of the present invention to fill these needs.

BRIEF SUMMARY OF THE INVENTION

Reciprocating slat conveyors of the present invention are basically characterized by a plurality of laterally spaced apart, longitudinally extending, V-shaped upper conveyor slats and a plurality of laterally spaced apart, longitudinally extending, V-shaped bottom conveyor slats. The upper conveyor slats each have a crown and opposite side portions that slope laterally outwardly and downwardly from the crown. The side portions have lower surfaces. The lower conveyor slats are positioned between the upper conveyor slats. Each lower conveyor slat includes a valley and side portions that slope laterally outwardly and upwardly from the valley. The side portions have upper and lower surfaces. The side portions of the upper slats overhang the side portions of the lower slats. The side portions of the lower slats have outer edge portions. A plurality of slide bearings are positioned vertically between the upper and lower conveyor slats where the side portions of the upper conveyor slats overhang the side portions of the lower conveyor slats. The slide bearings have upper surfaces on which the lower surfaces of the side portions of the upper conveyor slats slide. The slide bearings are preferably connected to the outer edge portions of the side portions of the lower conveyor slats. In use, the upper and lower conveyor slats reciprocate in a longitudinal direction, and are supported for such movement by the slide bearings.

A bearing support may be positioned vertically below each slide bearing. Each upper conveyor slat may include a frame member that is connected to the upper conveyor slat and extends downwardly from it between a pair of slide bearings and a pair of bearing supports. A linear drive motor is connected to the frame member. In similar fashion, each lower conveyor slat may include a frame member that is connected to the lower conveyor slat and extends upwardly from it between a pair of slide bearings and a pair of bearing supports. A linear drive motor is connected to this frame member.

Preferably, the frame members for the upper and lower conveyor slats are elongated in the direction that the conveyor slats extend. The frame members for the upper slats each include a pair of spaced apart sidewalls and a top wall extending between and interconnecting the sidewalls. The sidewalls have lower edges that are connected to side portions of the upper conveyor slats above the bearings. In like fashion, the frame members for the lower conveyor slats are elongated in the direction that the lower conveyor slats extend. They also include a pair of spaced apart sidewalls and a top wall that extends between and interconnects the sidewalls. The sidewalls of these frame members have lower edges that are connected to the side portions of the lower conveyor slats above the bearings.

Each said linear hydraulic drive unit may be positioned endwise of its conveyor slat. Each linear hydraulic drive unit may include a fixed portion and a moveable portion. The moveable portion is connected to its conveyor slat. The frame members for the upper conveyor slats are connected to the upper conveyor slats endwise where the conveyor slats are connected to their drive units. The frame members for the lower conveyor slats are connected to the lower conveyor slats endwise of where the lower conveyor slats are connected to their drive units.

In preferred form, the side portions of the upper conveyor slats make a laterally outwardly widening acute angle with the side portions of the lower conveyor slats. This provides a laterally outwardly widening space between the conveyor slats which will make it difficult or prevent the compaction of material between the upper and lower slats.

Additional features, advantages and objects of the invention are described in the detailed description of the best mode, or preferred embodiment and/or are inherent in the structures that are illustrated and described. The general arrangements that are disclosed, the detailed descriptions, the drawings, and the claims which follow, are all parts of the description of the invention.

BRIEF DESCRIPTION OF THE SEVERAL VIEWS OF THE DRAWING

Like reference numerals and letters refer to like parts throughout the several views of the drawing, and.

DETAILED DESCRIPTION OF THE INVENTION

FIGS. 1–8 show a preferred embodiment of the invention. It comprises a plurality of laterally spaced apart upper conveyor slats 10 and a plurality of lower conveyor slats 12 which are positioned below and between the upper conveyor slats 10. In the illustrated embodiment, there are four upper conveyor slats 10 and five lower conveyor slats 12, for a total of nine conveyor slats. Other embodiments may include three, six, twelve, fifteen, eighteen or other multiples of three conveyor slats. In the illustrated embodiment, each conveyor slat is provided with its own linear hydraulic drive unit DU1–DU9.

Figure 6:
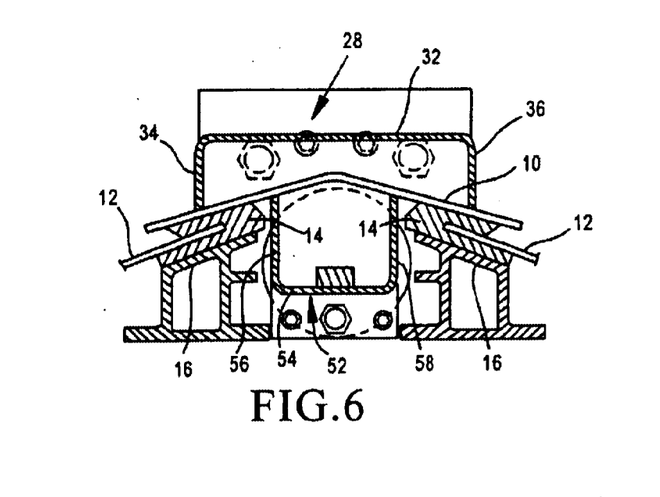
FIG. 6 is a cross-sectional view taken substantially along line 6—6 of FIG. 4.
Figure 7:
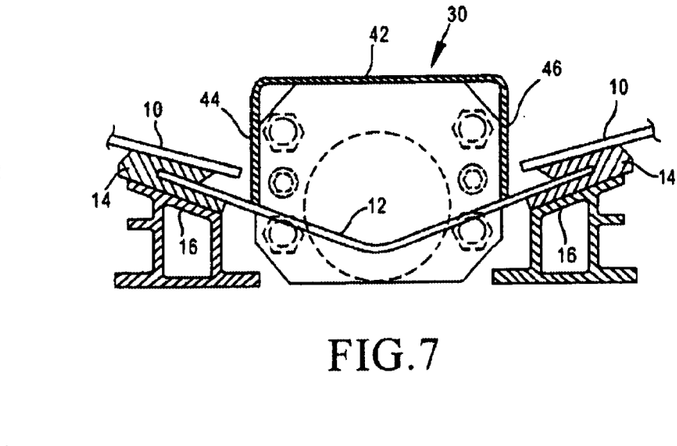
FIG. 7 is a cross-sectional view taken substantially along line 7—7 of FIG. 5.
Figure 8:
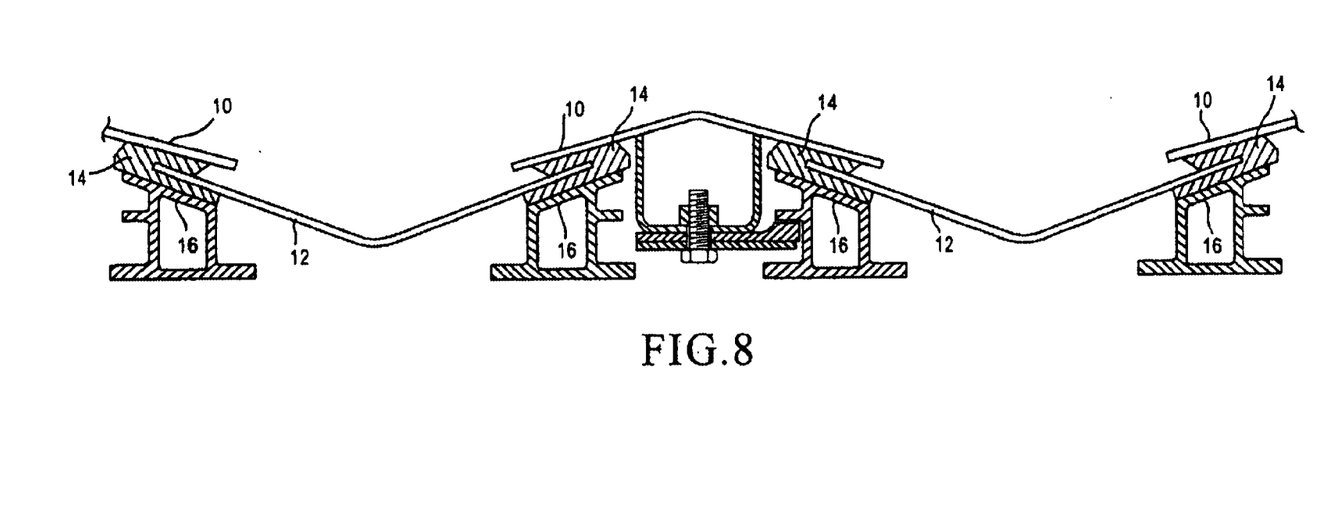
FIG. 8 is a cross-sectional view taken substantially along line 8—8 of FIG. 4.

Referring to FIGS. 6 and 8, the upper conveyor slats 10 have a center crown and side portions that slope downwardly and outwardly from the crown portion. Referring to FIGS. 7 and 8, the lower conveyor slats 12 each have a central valley and side portions that slope upwardly and outwardly from the valley. Each conveyor slat 10, 12 is supported by a pair of slide bearings 14. Each slide bearing 14 has an upper portion that is in sliding contact with a lower surface of a side portion of an upper conveyor slat 10 and a lower portion that rests and slides on a bearing support member 16. Each slide bearing 14 also includes a longitudinal space in which an outer edge portion of one of the lower conveyor slats 12 is received. In the illustrated embodiment, this space is in the form of a slot that extends longitudinally of the bearing 14. A side edge portion of the conveyor slat 12 is snugly received within the slot. When the slats 10 reciprocate back and forth, they slide on upper portions of the bearings 14. When the slats 12 reciprocate back and forth, they and the bearings 14 move together.

The bearings 14 are preferably attached to the lower slats 12 so that they slide with the lower slats 12 relative to both the upper slats 10 and the tops of the upper bearing supports 16. The bearing supports 16 are suitably connected to frame structure that is below the conveyor. By way of example, the bearing support 16 may be bolted at locations along their lengths to cross members such as member 18, shown in FIG. 1. Another way of securing the bearing supports 16 to a frame below the conveyor is disclosed by the aforementioned U.S. Pat. No. 5,044,870.

Figure 1:
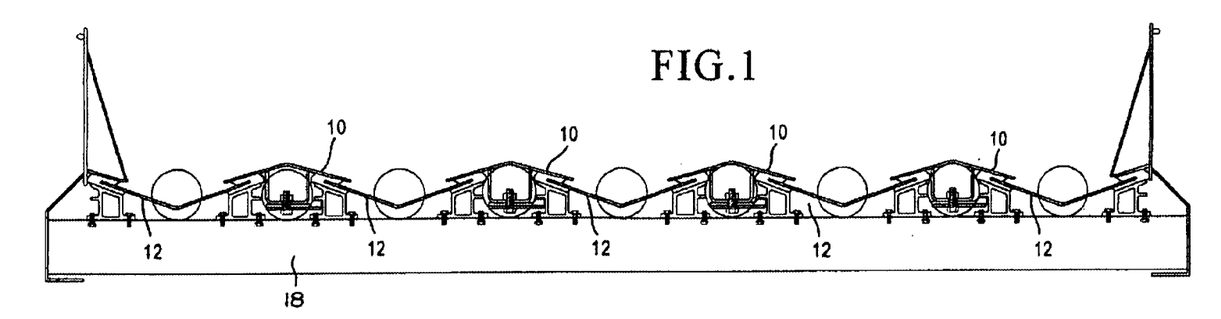
FIG. 1 is an elevational view looking toward an open end of a reciprocating slat conveyor.
Figure 4:
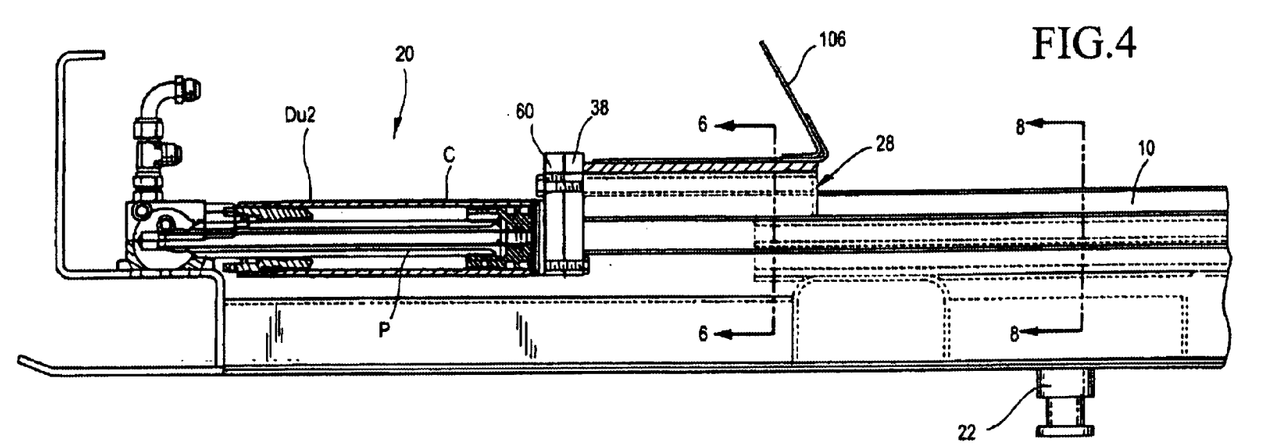
FIG. 4 is a longitudinal sectional view of one of the upper conveyor slats and its associated drive system.
Figure 5:
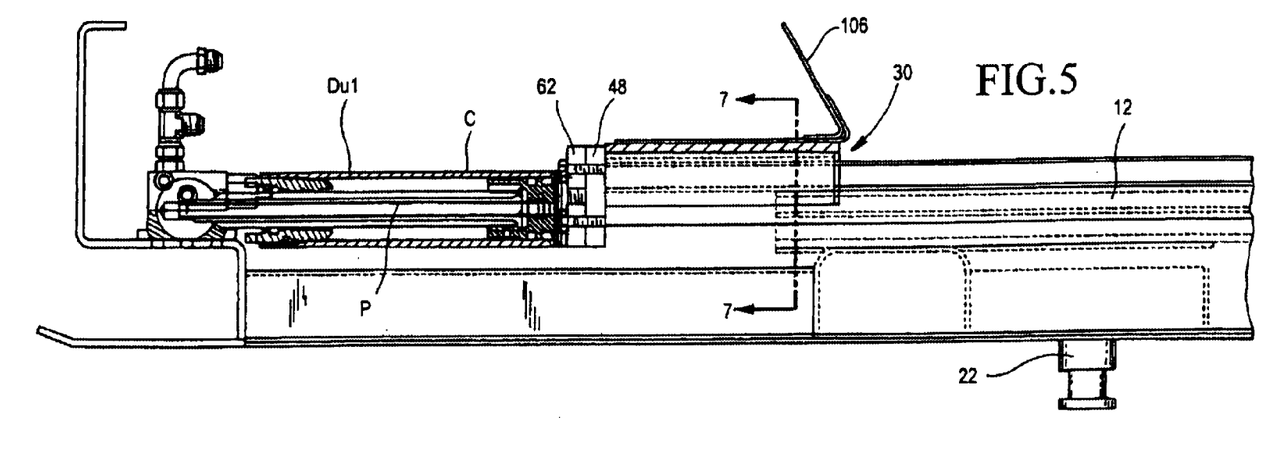
FIG. 5 is a longitudinal sectional view of one of the lower conveyor slats and its associated drive system.

In the illustrated embodiment, the conveyor slats 10, 12 are connected at at one end to the drive units DU1–DU9. The drive units DU1–DU9 are located on a platform or within a compartment 20 at the forward end of a box or compartment in which the conveyor is located. FIGS. 1, 4 and 5 show the conveyor within a trailer box that is shown to include a king pin 22. The arrangement within the trailer box is similar to the arrangement that is disclosed in U.S. Pat. No. 5,096,356, issued Mar. 17, 1992 to Raymond Keith Foster. In another embodiment, in lieu of a separate drive unit for each conveyor slat, a drive assembly of the type disclosed by U.S. Pat. No. 5,096,356 could be used. That is, every third slat could be connected to a different transverse drive beam and the three transverse drive beams can each be connected to a different drive unit.

Figures 10, 11:
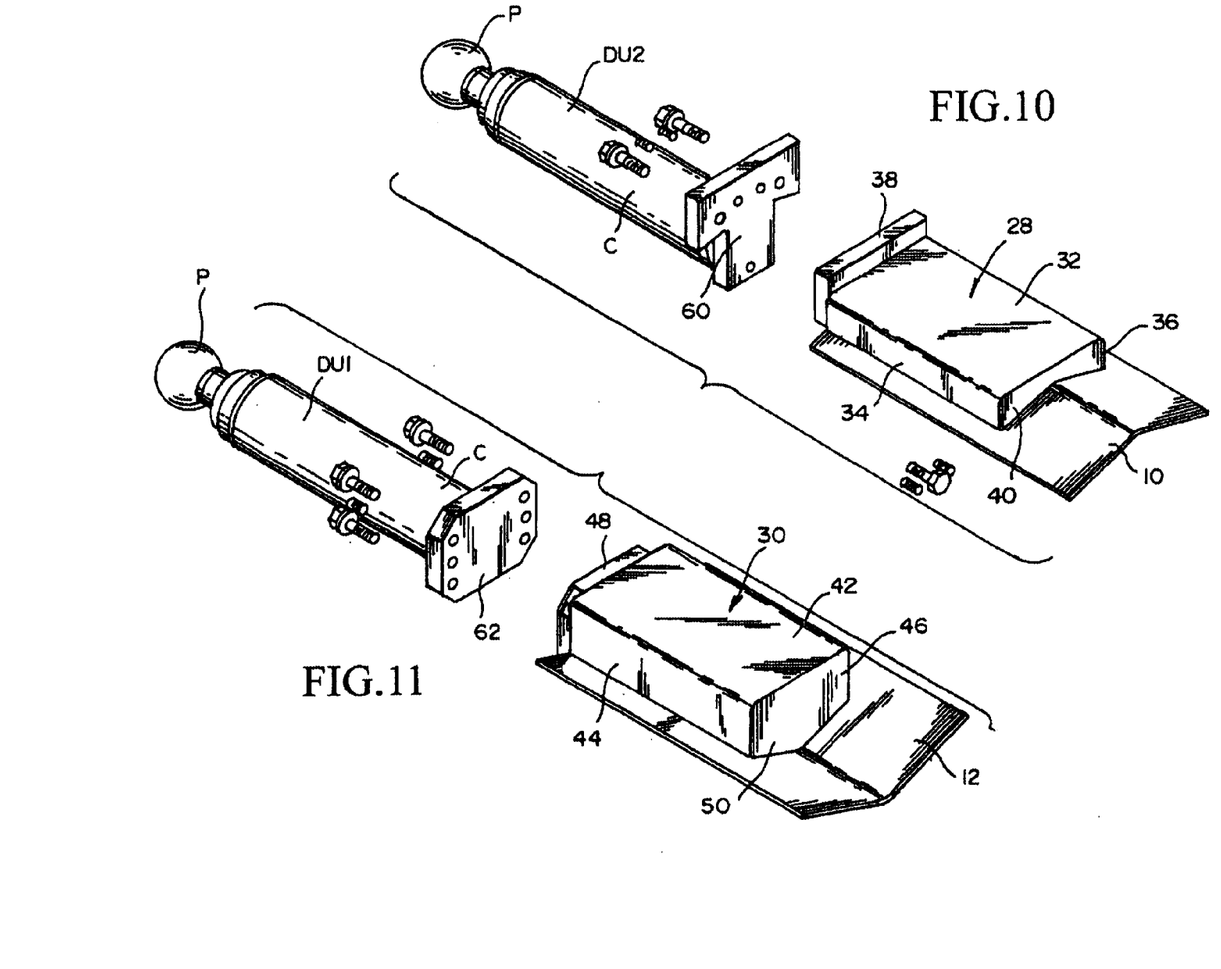
FIG. 10 is an exploded pictorial view of an end portion of an upper conveyor slat spaced from its drive unit.
FIG. 11 is an exploded pictorial view of an end portion of a lower conveyor slat spaced from its linear hydraulic drive unit.

FIG. 10 shows a frame member 28 connected to an end portion of an upper conveyor slat 10. FIG. 11 shows a frame member 30 connected to an end portion of a lower conveyor slat 12. Frame member 28 has a top 32, a pair of sidewalls 34, 36 and a pair of end walls 38, 40. In similar fashion, frame member 30 has a top 42, sides 44, 46 and end walls 48, 50. As best shown by FIG. 6, the lower edges of the sidewalls 34, 36 rest on and are welded to the upper conveyor slat 10. As shown by FIG. 7, the lower edges of sidewalls 44, 46 rest on and are welded to the end portion of the lower conveyor slat 12.

Each upper conveyor slat 10 may also include a lower frame member 52 that is connected to a central portion of the conveyor slat 10 and extends from it downwardly between the two bearings 14 and the two bearing supports 16. This frame member 52 may have a bottom wall 54 and a pair of sidewalls 56, 58. The upper edges of the sidewalls 56, 58 contact and are welded to central portions of the upper conveyor slat 10.

As shown by FIGS. 10 and 11, the drive units DU1, DU2 have a fixed component P and a moveable component C. In the illustrated embodiment, the fixed component P is a piston and the moveable component C is a cylinder. The closed end of each cylinder C includes a frame member 60, 62. Frame member 60 is bolted to end wall 38 on frame member 28. End member 62 is boarded to the end wall 48 on frame member 30. The bolt pattern is shown in FIGS. 6, 7, 10 and 11.

Figure 12:
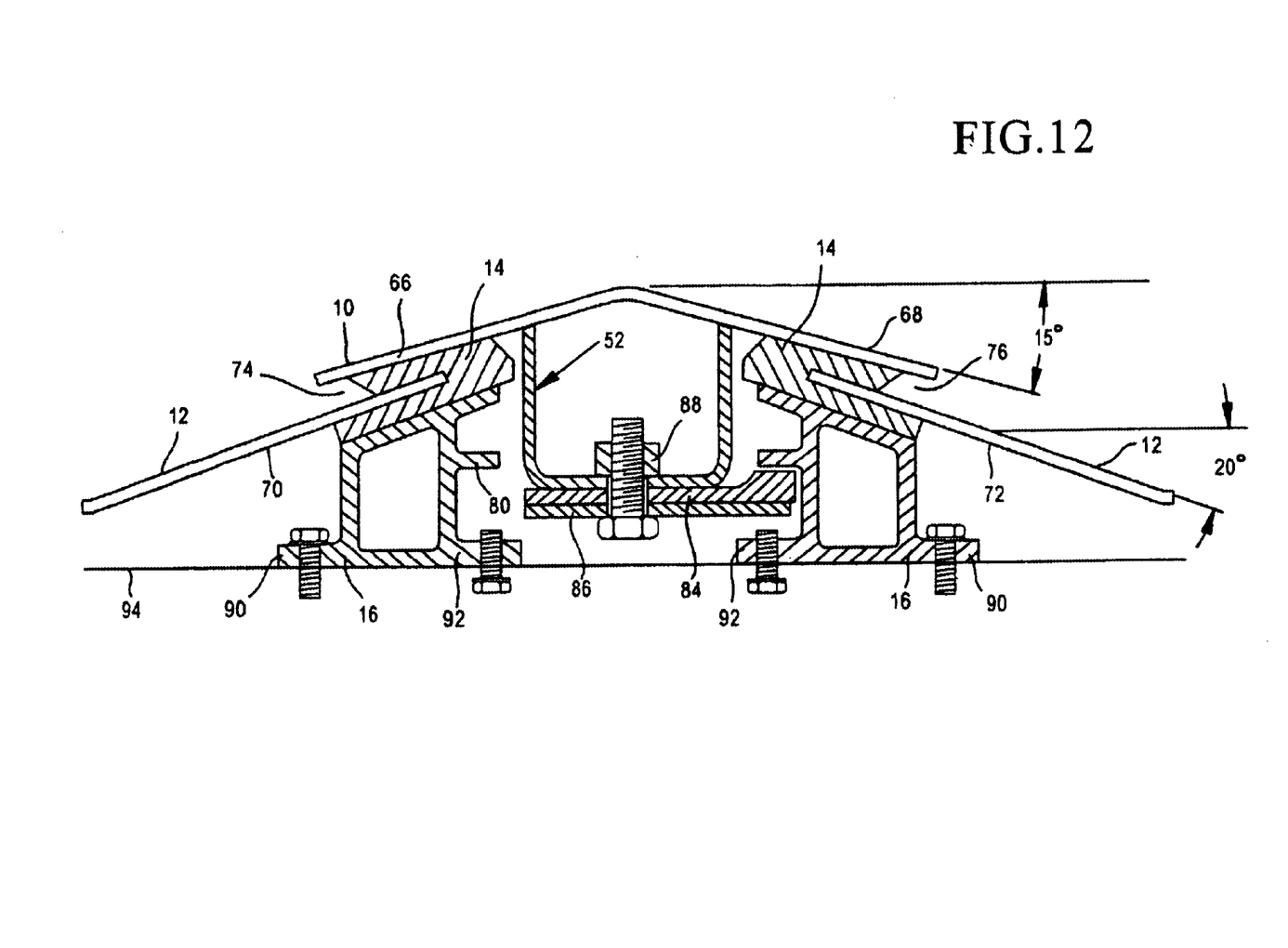
FIG. 12 is an enlarged scale view of one of the upper conveyor slats, together with adjoining side portions of the two adjacent lower conveyor slats.

FIG. 12 shows that the side portions 66, 68 of the upper conveyor slats slope downwardly from horizontal at an acute angle. By way of example, this angle may be about 15°, as shown by FIG. 12. The side portions 70, 72 of the lower conveyor slats 12 preferably slope downwardly at a larger angle from horizontal, e.g. 20°, as shown in FIG. 12. This difference in the slopes means that the side portions 66, 70 and the side portions 68, 62 have an acute angle between them. In the example shown, this angle is about 5°. As a result, the likelihood of the material compacting in the spaces 74, 76 is reduced substantially or prevented altogether.

The bearings 14 may be comprised of long strips or a plurality of relatively short strips. If the bearing members 14 are constructed as illustrated, they will be trapped both vertically and horizontally between the upper and lower conveyor slats 10, 12. What is important is that the edge portions of the lower conveyor slats 12 rest on portions of the bearings 14 that are supported on the bearing supports 16. The bearings 14 can be constructed in a number of other ways. For example, the lower portion of each bearing may be a member that hooks onto the upper wall of the bearing support 16. The upper portions of the bearings 14 may hook onto the lower bearing portions.

FIG. 12 shows that the bearing supports 16 may be provided with laterally inwardly extending flanges 80, 82. A member 84 made from bearing material and a backup member 86 made from metal, may be secured by a nut and bolt assembly 88 to the lower frame member 52. Member 84 may then project over into a position below a flange 82. This arrangement would prevent the top slat 10 from moving upwardly off from the bearings 14. Any force acting on top slat 10, causing it to move upwardly, would be resisted by contact of member 84 with flange 82. This "hold-down" of the upper conveyor slat 10 would also cause a "hold-down" of the flanking lower conveyor slats 12. An upward force acting on the conveyor slats 12, tending to move the lower slat and the bearings 14 upwardly, would be resisted by contact with the upper conveyor slat 10. The upper conveyor slat 10 will hold the lower conveyor slats 12 against upward movement because of the contact between member 84 and flange 82. Member 86 provides a stiffening backup for the member 84, which is preferably made from a self-lubricated bearing material. In preferred form, the bearing supports 16 have a pair of support flanges 90, 92 that extend lengthwise of the supports 16. Bolts may extend upwardly and/or downwardly through the flanges 90, 92 and secure them to the base member, indicated generally at 94 in FIG. 12.

Figure 2:
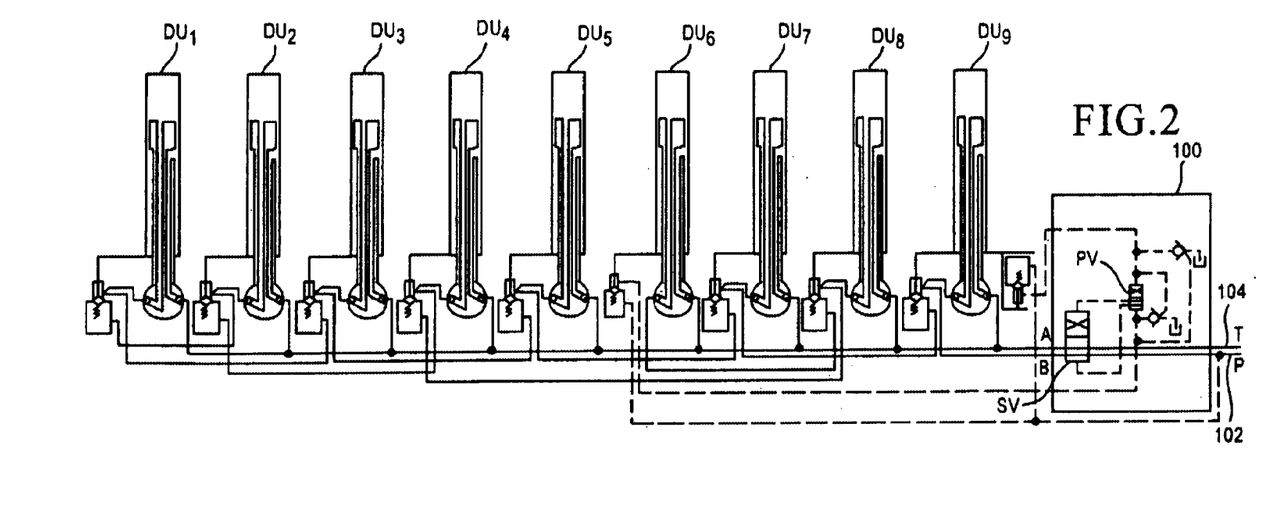
FIG. 2 is a schematic view of a hydraulic control system for linear hydraulic drive units that are a part of the preferred embodiment.
Figure 3:
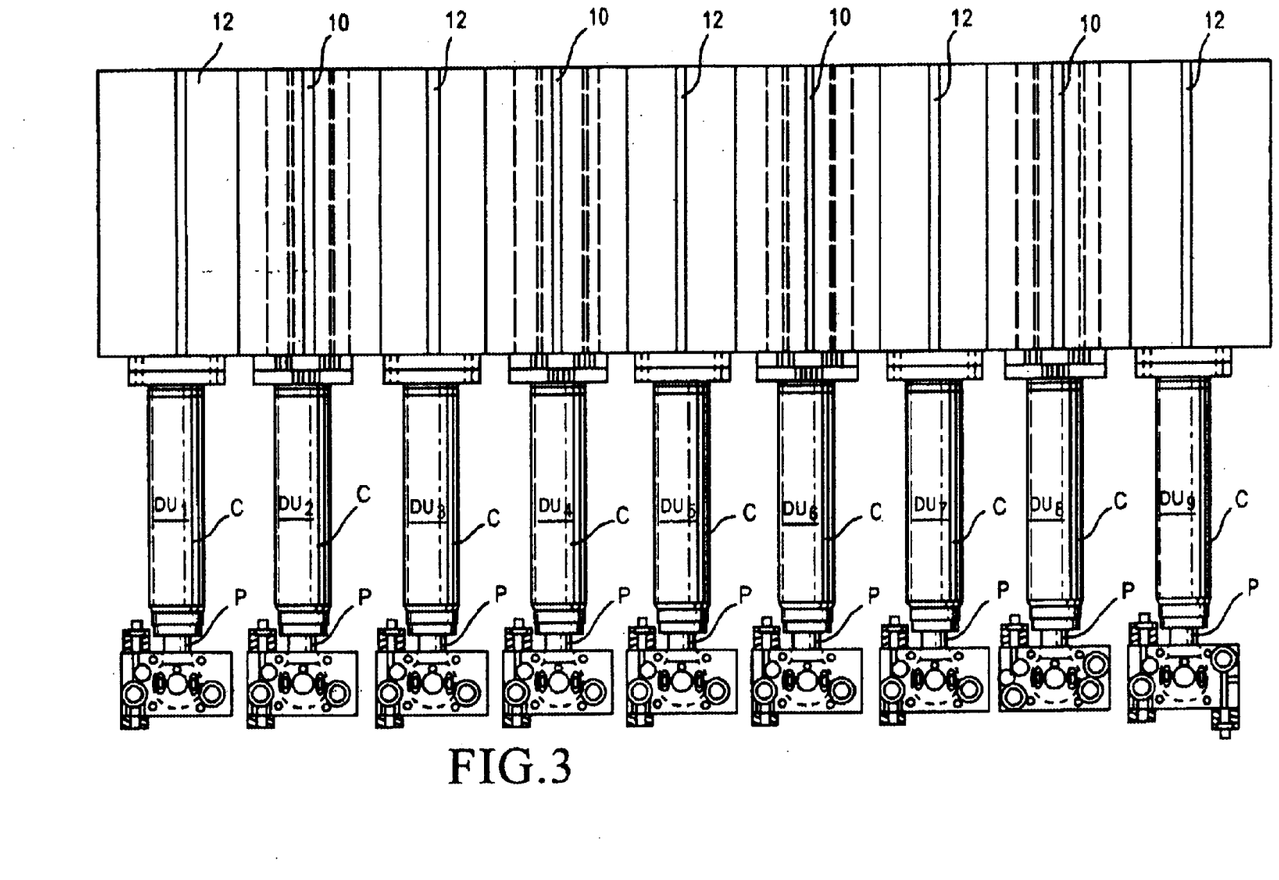
FIG. 3 is a top plan view of the assembly of hydraulic drive units that are
Figure 9:
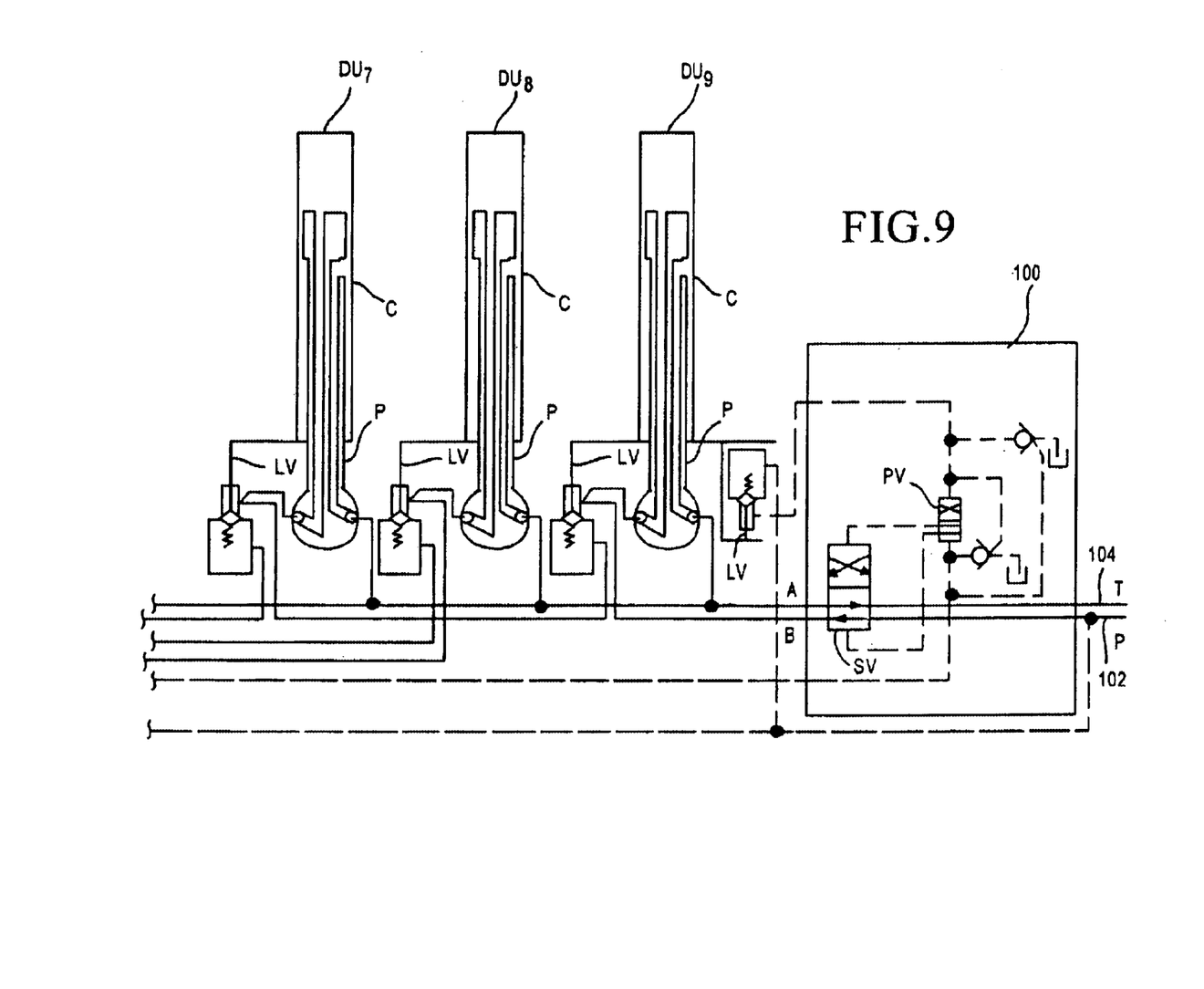
FIG. 9 is an enlarged-scale fragmentary view of the hydraulic control system shown by FIG. 2.

Block 100 in FIGS. 2 and 9 represents an inlet/outlet portion of the fluid supply and control system. Conduit 102 is a pressure line and conduit 104 is a return line. Valve SV is a switching valve. Valve PV is a pilot valve. The part of the system represented by box 100 may be supplied by the combination switching and pilot valve that is disclosed in U.S. Pat. No. 5,096,356, granted Mar. 17, 1992 to Raymond Keith Foster. The system shown by FIGS. 2 and 9 includes limit valves LV which may be like the limit valves disclosed in the aforementioned U.S. Pat. No. 5,096,356. The construction of the limit valves LV, and their role in the system, are known per se.

FIGS. 2 and 9 show a fluid supply and control system for the drive units DU. The fluid supply control system is not a part of the invention and will, therefore, not be described in any further detail in this application. A preferred system will be described in greater detail in co-pending application Ser. No. 10/375,225, filed Feb. 26, 2003 and entitled Drive Units And Drive Assemblies. Another suitable control and drive system is disclosed by the aforementioned U.S. Pat. No. 5,096,356. U.S. Pat. No. 5,096,356 is hereby incorporated herein by this specific reference.

The assembly of drive units DU1–DU9 may be housed within a compartment positioned at one end of the conveyor and separated from the conveyor slats 10, 12 by a wall or bulkhead 106 (FIGS. 4 and 5). A suitable seal (not shown) may be provided between the lower portion of the bulkhead 104 and the frame members 28, 40. The seals may extend to the conveyor slats 10, 12 as well.

The illustrated embodiments are only examples of the present invention and, therefore, are non-limitive. It is to be understood that many changes in the particular structure, materials and features of the invention may be made without departing from the spirit and scope of the invention. Therefore, it is my intention that my patent rights not be limited by the particular embodiments illustrated and described herein, but rather are to be determined by the following claims, interpreted according to accepted doctrines of patent claim interpretation, including use of the doctrine of equivalents and reversal of parts.

What is claimed is:

1. A reciprocating slat conveyor, comprising:
   a plurality of laterally spaced apart, longitudinally extending, V-shaped upper conveyor slats, each having a crown and opposite side portions that slope laterally outwardly and downwardly from the crown, said side portions having lower surfaces;
   a plurality of laterally spaced apart, longitudinally extending, V-shaped lower conveyor slats positioned between the upper conveyor slats, each said lower conveyor slat including a valley and side portions sloping laterally outwardly and upwardly from the valley, said side portions having upper and lower surfaces;
   said side portions of said upper conveyor slats overhanging said side portions of the lower conveyor slats;
   said side portions of said lower conveyor slats having outer edge portions;
   a plurality of slide bearings positioned vertically between the upper and lower conveyor slats where the side portions of the upper conveyor slats overhang the side portions of the lower conveyor slats;
   said slide bearings having upper surfaces on which the lower surfaces of the side portions of the upper conveyor slats slide, said slide bearings also having spaces in which the outer edge portions of the side portions of the lower conveyor slats are received; and
   whereby in use, the upper and lower conveyor slats reciprocate in the longitudinal direction and are supported for such movement by the slide bearings.

2. The reciprocating slat conveyor of claim 1, comprising a bearing support vertically below each slide bearing.

3. The reciprocating slat conveyor of claim 2, wherein each upper conveyor slat includes a frame member connected to the upper conveyor slat and extending downwardly from it between a pair of slide bearings and a pair of bearing supports, and a linear hydraulic drive motor is connected to said frame member.

4. The reciprocating slat conveyor of claim 3, wherein the frame members are elongated in the direction that the upper conveyor slats extend, and each frame member includes a pair of spaced apart sidewalls and a top wall extending between and interconnecting the sidewalls, said sidewalls having lower edges that are connected to the side portions of the upper conveyor slats above the bearings.

5. The reciprocating slat conveyor of claim 4, wherein each said linear hydraulic drive unit is positioned endwise of its conveyor slat and includes a fixed portion and a moveable portion, said moveable portion being connected to its conveyor slat.

6. The reciprocating slat conveyor of claim 5, wherein the frame members are connected to the upper conveyor slats endwise of where the upper conveyor slats are connected to their drive units.

7. The reciprocating slat conveyor of claim 4, wherein the side portions of the upper conveyor slats make a laterally outwardly diverging acute angle with the side portions of the lower conveyor slats.

8. The reciprocating slat conveyor of claim 3, wherein each lower conveyor slat includes a frame member connected to the lower conveyor slat and extending upwardly from it between a pair of slide bearings and a pair of bearing supports, and a linear hydraulic motor is connected to said frame member.

9. The reciprocating slat conveyor of claim 8, wherein the frame members are elongated in the direction that the lower conveyor slats extend, and each frame member includes a pair of spaced apart sidewalls and a top wall, extending between and interconnecting the sidewalls, said sidewalls having lower edges that are connected to the lower conveyor slats above the bearings.

10. The reciprocating slat conveyor of claim 9, wherein said linear hydraulic drive units for said lower slats are each positioned endwise of its lower conveyor slat and each includes a fixed portion and a moveable portion, said moveable portion being connected to its conveyor slat.

11. The reciprocating slat conveyor of claim 10, wherein the frame members for the lower conveyor slats are connected to the lower conveyor slats endwise of where the lower conveyor slats are connected to their drive units.

12. The reciprocating slat conveyor of claim 8, wherein the side portions of the upper conveyor slats make a laterally outwardly diverging acute angle with the side portions of the lower conveyor slats.

13. The reciprocating slat conveyor of claim 3, wherein the side portions of the upper conveyor slats make a laterally outwardly diverging acute angle with the side portions of the lower conveyor slats.

14. The reciprocating slat conveyor of claim 2, wherein each lower conveyor slat includes a frame member connected to the lower conveyor slat and extending upwardly from it between a pair of slide bearings and a pair of bearings supports, and a linear hydraulic drive motor is connected to said frame member.

15. The reciprocating slat conveyor of claim 14, wherein the frame members are elongated in the direction that the upper conveyor slats extend, and each frame member includes a pair of spaced apart sidewalls and a top wall extending between and interconnecting the sidewalls, said sidewalls having lower edges that are connected to the side portions of the lower conveyor slats above the bearings.

16. The reciprocating slat conveyor of claim 15, wherein each said linear hydraulic drive unit is positioned endwise of its lower conveyor slat and includes a fixed portion and a moveable portion, said moveable portion being connected to its conveyor slat.

17. The reciprocating slat conveyor of claim 16, wherein the frame members are connected to the lower conveyor slats endwise of where the lower conveyor slats are connected to their drive units.

18. The reciprocating slat conveyor of claim 15, wherein the side portions of the upper conveyor slats make a laterally outwardly diverging acute angle with the side portions of the lower conveyor slats.

19. The reciprocating slat conveyor of claim 3, wherein the side portions of the upper conveyor slats make a laterally outwardly diverging acute angle with the side portions of the lower conveyor slats.

20. The reciprocating slat conveyor of claim 2, wherein the slide bearings are secured to the lower conveyor slats and they slide with the lower conveyor slats relatively along the bearing supports.

21. The reciprocating slat conveyor of claim 20, wherein the side portions of the upper conveyor slats make a laterally outward diverging acute angle with the side portions of the lower conveyor slats.

22. The reciprocating slat conveyor of claim 1, wherein the side portions of the upper conveyor slats make a laterally outwardly diverging acute angle with the side portions of the lower conveyor slats.

\* \* \* \* \*